March 15, 1927.
W. L. THOMAS
1,620,787
COMBINED AIRPLANE AND HELICOPTER
Filed Sept. 27, 1926   2 Sheets-Sheet 1
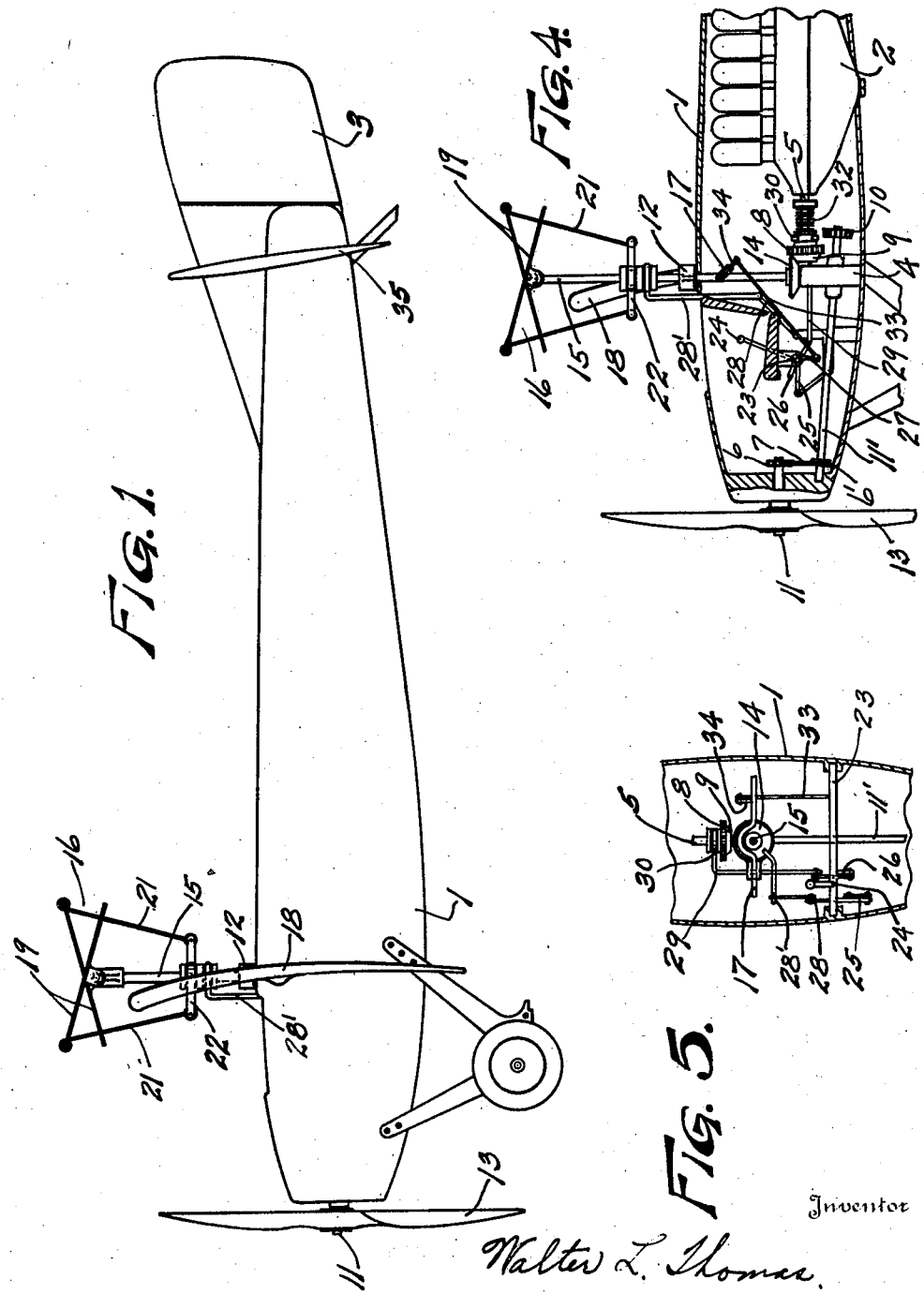

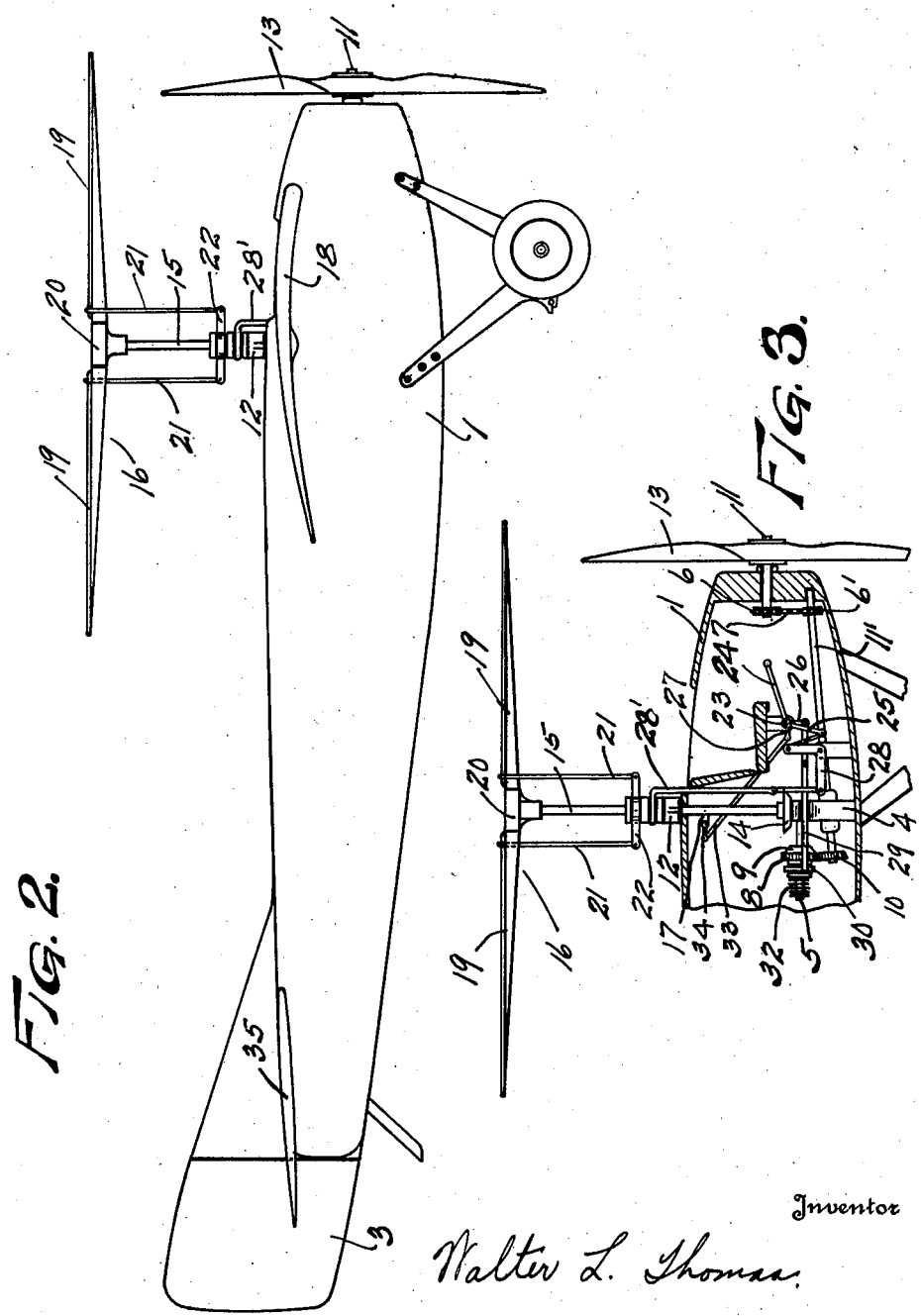

Patented Mar. 15, 1927.

1,620,787

UNITED STATES PATENT OFFICE.

WALTER L. THOMAS, OF FRUITLAND, FLORIDA.

COMBINED AIRPLANE AND HELICOPTER.

Application filed September 27, 1926. Serial No. 137,899.

This invention is in the nature of a combined airplane and helicopter, and the object is to provide a combination of this character having means for raising the vehicle directly upward through the air, independent means for propelling the vehicle forward through the air, and further independent means for steering the vehicle angularly upward, or allowing it to glide angularly downward. Other objects and advantages of the structure will appear in the course of this specification, reference being had to the accompanying drawing, wherein—

Figure 1 is a left side view of the machine as set for raising directly up from the ground.

Figure 2 is a right side view of the machine as set for travelling straight forward through the air after having attained the desired height.

Figure 3 is a detail of the lever and clutch system as shown on the right side of the machine in Figure 2, for shifting the engine power from the helicopter propeller to the plane propeller and vice versa, and at the same time adjusting the side wings and helicopter propeller blades horizontally for straight away flight, or vice versa for perpendicular flight.

Figure 4 is a detail of the wing levers mounted and shown on the left side of the machine in Figure 1.

Figure 5 is a sectional detailed plan view of the control and shifting levers.

In carrying out the invention a suitable fuselage 1 is provided carrying the engine 2 and adapted for steering laterally by the rudder 3. A suitable frame 4 is mounted in front of the engine and through this frame is journaled longitudinally and horizontally a propeller countershaft 11'. Sprocket wheels 6 and 6' mounted on this shaft and on the propeller shaft 11 and these sprockets are then connected by the chain 7. At the forward end of the engine shaft 5 are mounted a spur gear 8 and a bevel gear 9; the former being adapted, on the backward shift thereof to mesh with another spur gear 10, at the end of the propeller countershaft 11' journaled horizontally and longitudinally through the frame 4 and connected at its forward end to the plane propeller 13, and the latter adapted, on the forward shift of the said gears 8 and 9, to mesh with a relatively large bevel gear 14 on a helicopter shaft 15 journaled vertically in the frame 12, and carrying at its upper end the helicopter propeller 16. Thus by shifting the gears 8 and 9 so that the gears 9 and 14 mesh the helicopter propeller is brought into operation, and by meshing the gears 8 and 10 the plane propeller operates, either being released at the instant the other is engaged. Transversely through the fuselage 1 is journaled a wing shaft 17 carrying at its outer ends the wings 18 which by virtue of the rotatable mounting, may be readily turned to a vertical or horizontal position or to any intermediate inclination. The helicopter propeller blades 19 are pivotally mounted or journaled on the cross rod 20 secured to the shaft 15 so that these blades may be readily turned from their ordinary angular inclination to a position where they lie horizontally in one common plane, so as to offer no resistance to the air when the vehicle is moving on horizontal lines.

To facilitate such control of these blades 19, wires 21 are attached to the corners of the blades and extended down to a sleeve or collar 22 which is slidingly mounted on the shaft 15. By moving the collar 22 up or down on the shaft 15 the blades are correspondingly tilted angularly, as required for perpendicular flight, or horizontally as required for horizontal flight. A master rod 23 is journaled in the base of the frame 12 and from this rod are extended the lever arms 24, 25, 26, 27. The arm 24 constitutes a hand lever for moving attached elements. To the end of the arm 25 is pivotally attached the lower end of the blade lever 28—28', the upper end thereof being secured to the said collar 22, for controlling the blades 19, as described. To the end of the arm 26 is freely secured an end of the shift arm 29, which at 31 slidingly engages the frame 4 and at its other end is formed with a forked shifting arm 30 which straddles the hub of the spur gear 8 and by this arrangement, as the hand lever 24 is moved forwardly, the forked shifting arm 30 moves the said gear 8 and the attached bevel gear 9 backwardly, and meshes the gears 8 and 10 for adapting the machine to horizontal flight. On the other hand a spring 32 normally forces the gears 8 and 9 forwardly, with the bevel gear 9 in mesh with the gear 14, for operating the helicopter for perpendicular flight. To the end of the arm 27 is freely joined one end of the hinged wing control arm 33, the opposite end thereof being similarly attached to the wing lever 34 which is secured to the wing shaft 17. Thus the forward movement of the arm 27 results in throwing the wings 18 into a horizontal position, and the reverse movement into a vertical position or at any desired angle. The raising and lowering of the plane in a minor degree, on straight away flight is controlled by the usual elevation planes 35.

While I have herein described a certain specific method of constructing and assembling the elements of my invention, it is understood same may be varied in minor details, not departing from the spirit of my invention as defined in the appended claims.

I claim:

1. In an air vehicle of the class described, including a fuselage, engine and steering elements; the combination of helicopter and plane propellers, the former having blades adapted to set angularly or horizontally; means for applying motive power to either of the two propellers, alternately; and means for leveling the helicopter blades simultaneously with the shifting of power from the helicopter propeller to the plane propeller.

2. In an air vehicle, including a fuselage and motive power; the combination of helicopter and plane propellers operatively mounted on shafts, the helicopter blades being journaled for angular or horizontal set; control means for adjusting said blades; and means for applying power alternately to either set of blades, the control means for the helicopter blades and the means for shifting power being co-ordinated.

3. In an air vehicle, including a fuselage, motive power and steering devices; the combination of a supporting frame on the fuselage; helicopter and plane propellers on shafts journaled in the frame, the helicopter blades being adjustable from a common flat horizontal position to angular positions; side wings on a shaft journaled transversely in the frame; and co-ordinated leverage mechanisms for alternately applying motive power to either the helicopter or plane propellers, and for co-operatively and simultaneously flattening the helicopter propeller blades and leveling the side wings.

In testimony whereof I affix my signature.

WALTER L. THOMAS.